No. 875,960.  
PATENTED JAN. 7, 1908.  
B. B. SMITH & G. L. GAY, Jr.  
CAKE CUTTER.  
APPLICATION FILED SEPT. 29, 1906.
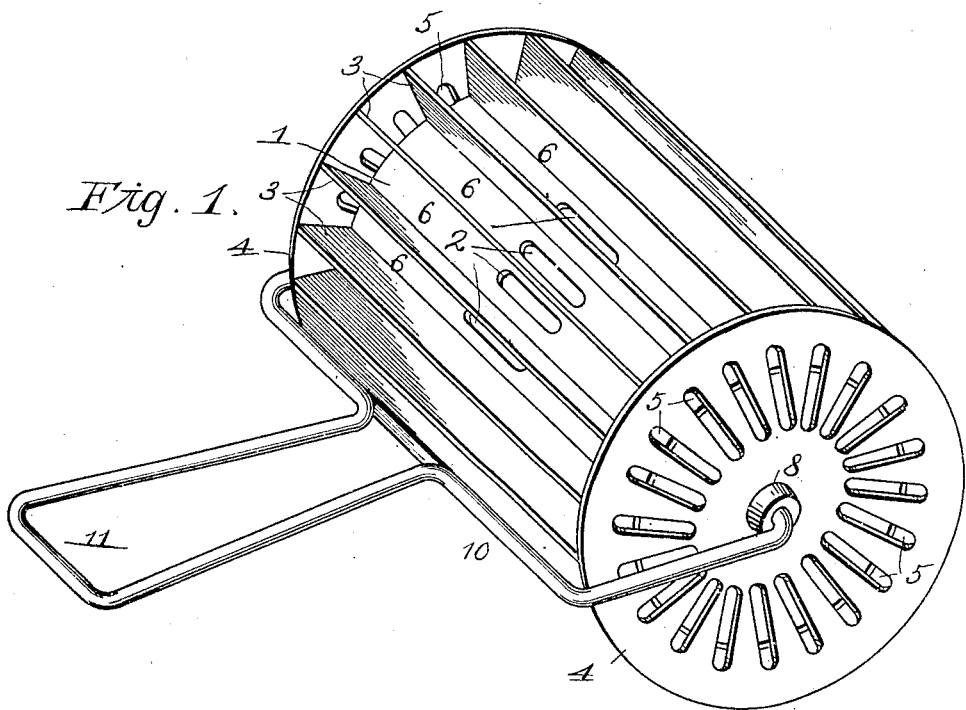
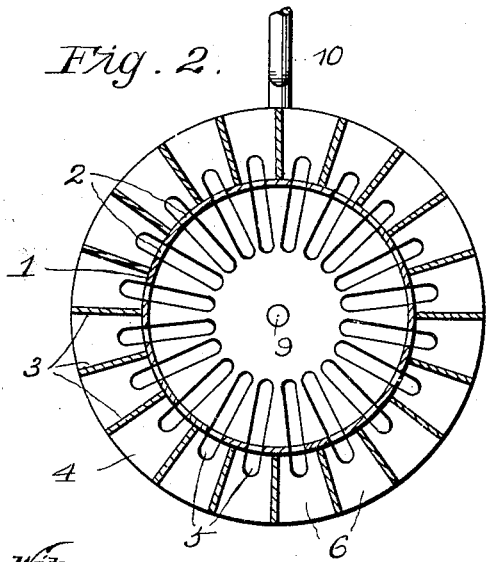
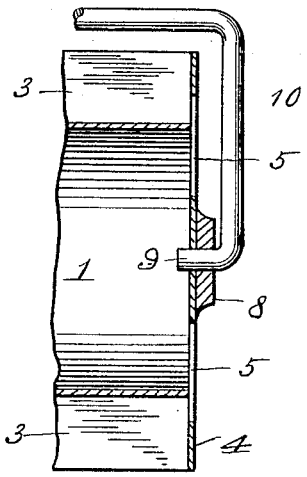
Witnesses:
Inventors:  
B. B. Smith and G. L. Gay, Jr.
By F. G. Fischer  
Atty.

UNITED STATES PATENT OFFICE.

BRYCE B. SMITH AND GEORGE L. GAY, JR., OF KANSAS CITY, MISSOURI, ASSIGNORS, BY MESNE ASSIGNMENTS, TO SAID SMITH.

CAKE-CUTTER.

No. 875,960.  Specification of Letters Patent.  Patented Jan. 7, 1908.

Application filed September 29, 1906. Serial No. 336,701.

*To all whom it may concern:*

Be it known that we, BRYCE B. SMITH and GEORGE L. GAY, Jr., citizens of the United States, residing at Kansas City, in the county of Jackson and State of Missouri, have invented certain new and useful Improvements in Cake-Cutters, of which the following is a specification.

Our invention relates to cake-cutters, and more particularly to that type wherein the cutter rotates, and is especially adapted to the cutting of doughnuts, ladyfingers, etc.

The device is arranged to cut the cakes in uniform length, width, and thickness, so that but a minimum amount of dough will be left to be worked over the second time. It is also arranged to leave the cakes upon the dough-board and thus avoid the difficulty heretofore experienced in having them stick to the blades, necessitating their removal by hand or shaking of the device and resulting in deforming the cakes.

In order that the invention may be fully understood, reference will now be made to the accompanying drawing, in which:

Figure 1 represents a perspective view of the cake-cutter. Fig. 2 is a vertical, central section of the same. Fig. 3 is a broken longitudinal section of one end of the cutter.

In carrying out the invention we employ a roller 1, having peripheral air-holes 2. 3 designates a plurality of blades, secured to the periphery of the roller and extending radially with respect to its axis.

4 designates a pair of disks secured to the ends of the roller and the blades, and provided with radially-extending air holes 5, which communicate with the interior of the roller and with the pockets 6, formed by the roller, blades, and disks.

8 designates bosses secured to the central portion of the disks to provide broad bearing surfaces for the inturned ends 9 of a handle 10, formed preferably of a single piece of wire, bent at its rear portion 11, to form a convenient grip for the operator.

In practice the cutter is run across a sheet of dough, the disks cutting the same into longitudinal strips, and the blades 3 cutting said strips into cakes of uniform width and thickness, the latter being accomplished through the instrumentality of the roller, which presses the dough into uniform thickness, as it travels over the same. Said roller also reinforces the cutter adding to its rigidity and durability and preventing the blades from springing to one side or the other; hence, the cutter will always do perfect work and cut the cakes in uniform size. As the air within the pockets escapes through the air-holes 2 and 5, the cakes will have no tendency to stick in said pockets; hence the time and labor heretofore required in removing the cakes will be saved.

Having thus described our invention, what we claim is:

In a cake-cutter, a drum provided with air-holes, blades secured to the periphery of said drum, and extending radially with respect to its axis, and disks secured to the ends of drum and the blades, provided with air-holes communicating with the interior of the drum and with the pockets formed by the drum, blades, and disks.

In testimony whereof we affix our signatures, in the presence of two witnesses.

BRYCE B. SMITH.
GEORGE L. GAY, JR.

Witnesses:
F. G. FISCHER,
M. J. COX.